United States Patent Office 2,803,911
Patented Aug. 27, 1957

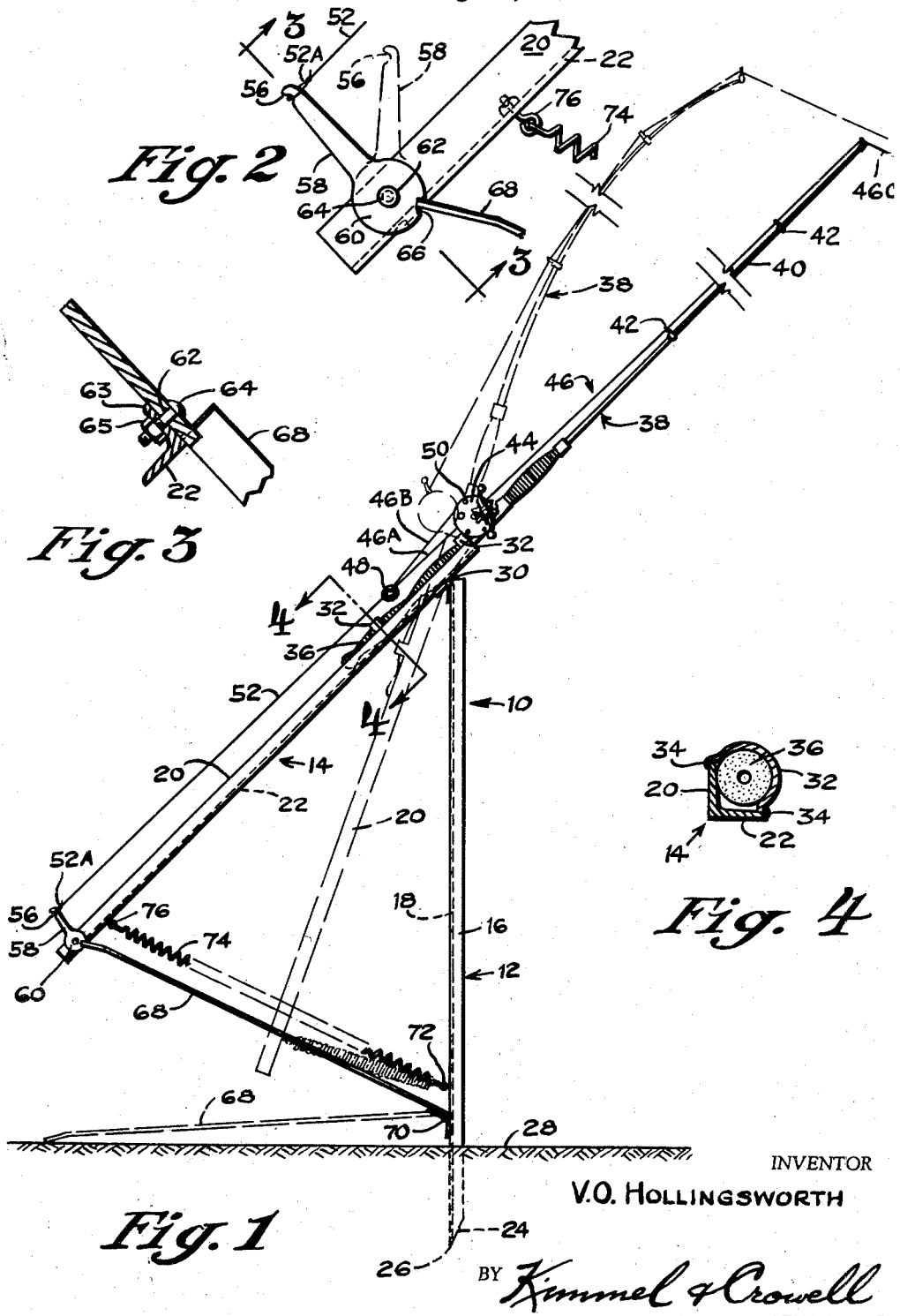

2,803,911

FISHING ROD SUPPORT

Vernon O. Hollingsworth, Wharton, Tex.

Application August 22, 1955, Serial No. 529,684

1 Claim. (Cl. 43—15)

This invention relates to a fishing rod support, and more specifically, the invention pertains to a fishing rod support having a trigger mechanism for imparting a sudden jerk to the fishing line in response to the striking of a fish at the bait or lure.

One of the primary objects of this invention is to provide a fishing rod support, together with the aforementioned trigger mechanism wherein the trigger is tripped by the force exerted on the fishing line as the fish strikes the bait whereby the fishing rod, under tension, imparts a sudden jerk to set the fishing line hook firmly in the fish.

Another object of this invention is to provide a fishing rod support, together with a trigger mechanism of the type referred to supra, with means for preventing the fouling of the fishing rod and line.

A further object of this invention is to provide a support and trigger mechanism for a fishing rod and reel wherein substantially the entire fishing rod is brought into play when the fishhook or lure is struck, thereby preventing the accidental breakage of the rod.

Still another object of this invention is to provide a surf or river fishing rod support especially designed for use with a surf rod and star drag reel. It is to be understood, however, that the invention is not expressly limited thereto.

As another object of this invention, it is proposed to provide a fishing rod support and trigger mechanism of the type described above which is inexpensive to manufacture, non-complex in construction and assembly, and which is durable in use.

Other and further objects and advantages of the present invention will become more evident from a consideration of the following specification when read in conjunction with the annexed drawing, in which:

Figure 1 is a side elevational view of a fishing rod and a support therefor constructed in accordance with the present invention;

Figure 2 is an enlarged fragmentary side elevational detail view of the trigger mechanism;

Figure 3 is an enlarged detail cross sectional view taken on the plane of line 3—3 of Figure 2, looking in the direction of the arrows, and Figure 4 is an enlarged detail cross sectional view taken on the plane of line 4—4 of Figure 1, looking in the direction of the arrows.

Referring now more specifically to the drawings, reference numeral 10 designates, in general, a fishing rod support constructed in accordance with the teachings of this invention. The support is seen to comprise a pair of L-shaped angle irons 12, 14 having integrally connected side walls 16, 18 and 20, 22, respectively. As is seen in Figure 1, the side wall 16 at its lower end tapers at 24 toward the side wall 18 to form a point or sharp edge 26 to facilitate the insertion of the member into the ground 28.

At their respective upper ends, the side wall 18 of the angle member 12, and the side wall 22 of the angle member 14 are pivotally connected by hinge means 30. A plurality of substantially semi-circular bands 32 are fixedly secured, as by welding 34, to the angle iron 14 adjacent the pivoted upper end thereof in longitudinal spaced relation. As is seen in Figure 1, a fishing rod handle 36, formed of a compressible material such as cork, of a fishing rod 38 is mounted on the upper end of the angle iron 14 and is releasably secured thereon beneath the hands 32. The fishing rod 38 is of conventional manufacture and includes one or more detachable rod sections 40 having a plurality of eyed rings or line guides 42 fixedly secured thereto in longitudinally spaced relation. A conventional reel 44 is mounted on the handle 36 and is preferably, though not necessarily, equipped with a star drag reel. A fishing line 46 has its leading end portion 46A threaded through a ring 48 and has a reverted portion 46B threaded over and under the conventional drag bars 50 of the reel 38. The line 46 is then threaded through the guides 42 and the free end 46C thereof is connected with a baited hook or conventional lure, not shown.

One end of a flexible line 52 is fixedly secured to the ring 48 and its other end is looped at 52A for loose engagement within a notch 56 formed in one end of a trigger lever 58 positioned adjacent the lower end of the angle member 14. The other end of the trigger lever 58 is integrally formed with, or rigidly connected to, an enlarged, substantially circular boss 60 having a central aperture 62. A bolt 64 extends through the aperture 62 and an aperture 63 formed in the side wall 20 and is secured thereto by a nut 65. The bolt 64 serves as an axle about which the trigger lever 58 and the boss 60 pivots.

As is clearly seen in Figures 1 and 2, the boss 60 is provided with a recess 66 which is adapted to loosely receive therein one end of an elongated substantially rectangular trigger latch bar 68, the other end of which is pivotally or hingedly mounted at 70 on the side wall 18 of the angle iron 12.

An eye bolt 72 is secured to the lower end of the side wall 18 and has one end of a helicoidal spring 74 fixedly connected thereto. The other end of the spring 74 is fixedly connected to an eye bolt 76 which is in turn rigidly mounted on the side wall 22 of the angle iron 14.

It should be noted that with the above-described elements in their respective positions, as illustrated in Figure 1 of the drawing, a line of force is directed against the boss 60 which tends to turn the trigger lever 58 in a counterclocwise direction.

Let it now be assumed that the fish line hook or lure secured to the free end 46C has been cast and the rod 38 is mounted and supported as described. A fish striking at the hook will exert a force on the line 46 which pulls on the ring 48. The force is then transmitted from the ring to the line 52 which pulls the trigger lever 58 in a clockwise direction. This, in turn, causes the boss 60 to rotate to effect disengagement of the adjacent end of the trigger latch bar from the recess 66 and it then pivots downward to the dotted line position shown in Figure 1. As the trigger lever 58 pivots, the looped end 52A is fired from the recess 56.

The angle iron member 14, now being free to move under the tension of the spring 74, suddenly whips and pivots toward the angle member 12. This produces a jerk on the line 46 which firmly sets the hook in the striking fish.

It should be noted that as this action takes place, substantially the entire rod is used when whipping or snapping to the dotted line position shown in Figure 1, and that the trigger mechanism is positive in operation.

The apparatus is reset merely by pulling the angle member 14 away from the angle member 12, repositioning the free end of the latch bar 68 within the recess 66, and again disposing the loop 52A in the notch 56 of the trigger lever 58.

Having described and illustrated one embodiment of this invention in detail, it is to be understood that the same is offered merely by way of example, and that the invention is to be limited only by the scope of the appended claim.

What is claimed as:

A support for a fishing rod of the type having a reel and fish line operatively associated therewith comprising an elongated member, a ground penetrating point formed on the lower end of said member, an elongated arm, hinge means pivotally securing one end of said arm to the upper end of said member, an elongated trigger finger having a notch adjacent one end thereof and a recess formed in the opposite end thereof, means adjacent said notch pivotally securing said trigger finger to the end of said arm opposite said pivoted securing means, a latch bar, means pivotally securing one end of said latch bar to said member adjacent the lower end thereof, said latch bar having the other end thereof releasably engaged in the recess in said trigger finger, a spring having its opposite ends connected to said member and said arm respectively adjacent to and parallel with said latch bar in substantial spaced relation to said hinge means and normally biasing said arm toward said member, means on the end of said arm opposite said trigger finger releasably securing said rod thereon, a trigger line, a loop formed in one end of said trigger line and engaged in said notch in said trigger finger and a ring secured to the other end of said trigger line and having said fishing line threaded therethrough, said trigger line having a length such that said fishing line extends rearwardly from said reel to said ring and then forwardly along said rod, said trigger line being adapted to be moved by action of said fish line whereby said trigger finger is rotated releasing said latch bar and said trigger line so that said arm is swung sharply toward said member by said spring causing said fish line to be moved to a hook setting position.

References Cited in the file of this patent

UNITED STATES PATENTS

| | | |
|---|---|---|
| 916,891 | Schildbach | Mar. 30, 1909 |
| 1,989,407 | Ezell | Jan. 29, 1935 |
| 2,642,690 | Soenksen | June 23, 1953 |